United States Patent [19]
Bart et al.

[11] Patent Number: 5,597,209
[45] Date of Patent: Jan. 28, 1997

[54] ADJUSTABLE VEHICLE SEAT ARMREST WITH A RATCHET

[75] Inventors: Kurt A. Bart, Brighton; Wojciech Wdziekonski, Detroit; Frank Wu, Novi, all of Mich.

[73] Assignee: Hoover Universal, Inc., Plymouth, Mich.

[21] Appl. No.: 438,770

[22] Filed: May 11, 1995

[51] Int. Cl.⁶ ........................... A47C 7/54
[52] U.S. Cl. ............... 297/411.38; 297/411.32; 297/440.1
[58] Field of Search ............. 297/411.2, 411.3, 297/411.32, 411.35, 411.38, 411.39, 440.1

[56] References Cited

U.S. PATENT DOCUMENTS

| | | | |
|---|---|---|---|
| 3,168,346 | 2/1965 | Rei, Jr. | |
| 3,779,600 | 12/1973 | Quakenbush | |
| 4,176,878 | 12/1979 | Koutsky | 297/411.32 X |
| 4,230,414 | 10/1980 | Cheshire | 297/411.38 X |
| 4,313,638 | 2/1982 | Roper | |
| 4,466,664 | 8/1984 | Kondou | 297/411.39 |
| 4,621,864 | 11/1986 | Hill | |
| 4,655,501 | 4/1987 | Ishigami et al. | |
| 4,807,935 | 2/1989 | King | 297/411.38 |
| 4,828,323 | 5/1989 | Brodersen et al. | 297/411.38 X |
| 4,886,317 | 12/1989 | Konzmann et al. | |
| 4,902,072 | 2/1990 | Chancellor, Jr. | 297/411.32 |
| 4,946,226 | 8/1990 | Hurn et al. | |
| 4,968,095 | 11/1990 | Moyer | |
| 4,978,170 | 12/1990 | Pelz et al. | |
| 5,044,691 | 9/1991 | Guchon | 297/DIG. 2 X |
| 5,076,645 | 12/1991 | Yokota | 297/411.32 |
| 5,106,160 | 4/1992 | Nomura et al. | 297/411.38 X |

FOREIGN PATENT DOCUMENTS 6141949   5/1994   Japan .................... 297/411.38

*Primary Examiner*—Milton Nelson, Jr.
*Attorney, Agent, or Firm*—Harness, Dickey & Pierce, P.L.C.

[57] ABSTRACT

An adjustable armrest for a vehicle seat in which a ratchet mechanism is provided to resist downward movement of the armrest and allow upward movement to adjust the armrest position relative to the seat back. The ratchet mechanism is released upon raising the armrest passed the upper end of its adjustment range enabling the armrest to be lowered to the lower end of its adjustment range wherein the ratchet mechanism again engages to hold the armrest in place. Attachment of the armrest to the seat back is provided by sliding the armrest over a mounting stud extending laterally from the seat back. A wire spring clip attached to the armrest seats in a groove in the stud to hold the armrest axially on the mounting stud. When assembled, the spring clip will be positioned at the interface between the armrest and the seat back enabling a flat tool such as a screw driver to be inserted between the armrest and the seat back to manipulate the clip to remove the armrest.

14 Claims, 5 Drawing Sheets

5,597,209

ADJUSTABLE VEHICLE SEAT ARMREST WITH A RATCHET

BACKGROUND AND SUMMARY OF THE INVENTION

This invention relates to a vehicle seat having an adjustable armrest and in particular to a ratchet mechanism for adjusting the armrest.

It is common for vehicle seats to include a reclining feature to enable the angle of the seat back to be varied from a generally upright position to a rearwardly reclined position within a given adjustment range. In addition, in two-door motor vehicles, it is common for the seat back of the front seat to rotate from its upright use position to a forward dump position to improve ingress and egress to and from the rear seat.

Bucket seats, particularly in vans, pick-up trucks and other multi-purpose passenger vehicles, are typically equipped with armrests which extend forward from the seat back on one or both sides of the seat back. The armrest is typically placed in an operative position relative to the seat back so that the armrest extends horizontally forward from the seat back. When the seat back is reclined rearwardly, it is necessary to adjust the angular position of the armrest relative to the seat back to maintain the armrest in a horizontal position. In addition, it is also desirable for the armrest to rotate upward to a stowed position, generally parallel with the seat back. This provides easier access to the seat itself and also, when the seat back is dumped forward, avoids unwanted contact between the armrest and other vehicle interior components.

Various mechanisms have been developed to provide an adjustable armrests. However, the addition of an adjustment mechanism can make the assembly of the seat more difficult. The adjustment mechanism typically requires mechanical interaction between the armrest and the seat back. This interaction makes it difficult to provide a fully trimmed seat back and a fully trimmed armrest which can be simply joined together.

Accordingly, it is an object of the present invention to provide an adjustable armrest for a seat back which can be fully trimmed prior to attachment of the armrest to the seat back.

It is a further object of the present invention to provide an armrest which can be easily attached to a seat back and removed from the seat back without requiring opening of the trim cover of either the armrest or the seat back.

The seat assembly of the present invention provides a mounting stud which extends laterally from the seat back. The armrest is provided with a sleeve extending into the armrest forming a bore which is sized to receive the mounting stud of the seat back. The armrest is attached to the seat back by sliding the sleeve over the mounting stud. A circumferential groove is provided in the stud while the sleeve carries a wire spring clip disposed within opposing circumferential slots in the sleeve. The portions of the wire clip in the circumferential slots crosses the sleeve bore forming chords. The chords are seated into the groove in the mounting stud when the armrest sleeve has been moved over the stud to the installed position of the armrest. The groove is positioned axially along the stud to be at the interface between the armrest and the seat back so that a flat tool such as a screw driver can be inserted between the armrest and the seat back to manipulate the spring clip, releasing the clip from the stud, to remove the armrest if needed for service or repair of the seat assembly.

Once installed, the armrest is rotatable about the stud within an adjustable range of use positions and is also rotatable to an upright stowed position parallel to the seat back. In the range of use positions, a ratchet mechanism is provided to prevent downward rotation of the armrest to enable the armrest to support a downward load applied by a seat occupant. The armrest is adjusted upwardly by pulling upward on the armrest. Doing so causes a pawl carried by the armrest to move into engagement with the next tooth of a sector gear fixed to the seat back. A spring holds the pawl in engagement with the teeth of the sector gear. Upon upward movement of the armrest beyond the range of use positions, a release tooth on the sector gear causes the pawl to rotate to an over center position in which the spring holds the pawl in a position disengaged from the teeth, enabling the armrest to rotate downward. Upon reaching the lower end of the adjustment range, a return tooth on the sector gear will engage the pawl and return it back over center so the pawl will engage the sector gear teeth once again.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
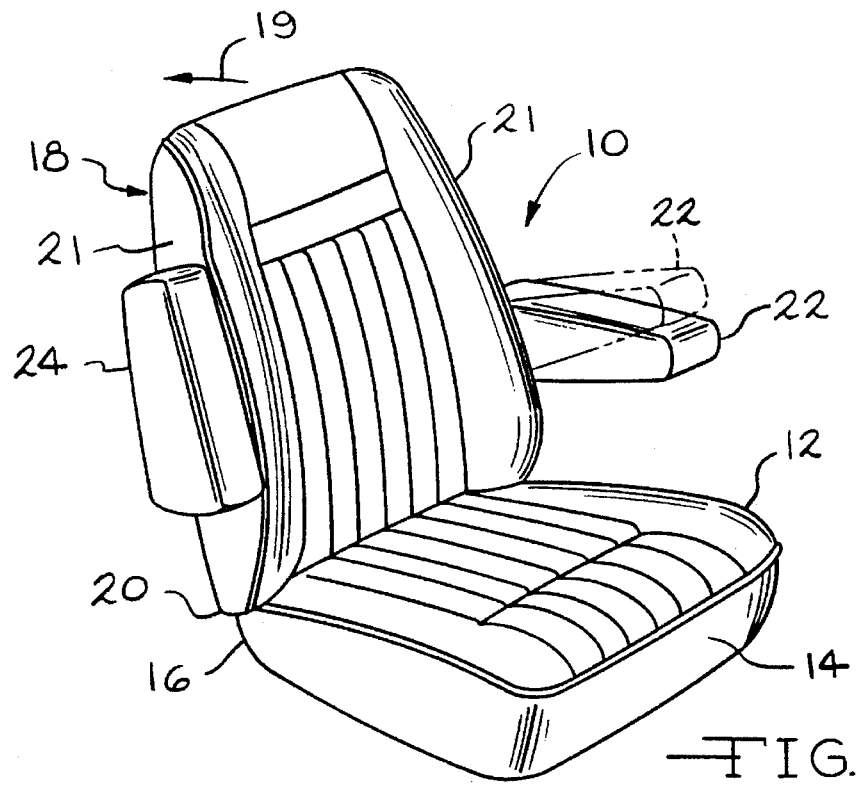
FIG. 1 in a perspective view of a seat assembly having a pair of adjustable armrests mounted to the seat back according to the present invention illustrating the various positions of the armrest.

A vehicle seat assembly having the adjustable armrest of the present invention is shown in FIG. 1 and designated at 10. The seat assembly 10 includes a lower seat cushion 12 having front and rear ends 14, 16, respectively. Extending upwardly in generally an upright position from the rear end of the seat cushion is a seat back 18. The seat back 18 is pivotally coupled at its lower end 20 to the seat cushion. The seat back may be reclined rearwardly from the upright position in the direction of the arrow 19 within a range of reclined positions to enable the seat back to be adjusted as desired by a seat occupant. Extending forwardly from the sides 21 of the seat back are armrests 22, 24.

Depending upon the vehicle in which the seat assembly 10 is installed, it may include one or both of the armrests 22, 24. The armrests 22, 24 are pivotally mounted to the seat back to enable the armrests to be raised to a stowed position generally parallel and along side the seat back as shown by the armrest 24. In addition, the armrests are rotatable within an adjustment range of use positions as shown by the two positions of the armrest 22. The adjustment range is provided to enable the armrest to be adjusted to a horizontal position following adjustment of the seat back angle.

Figure 4:
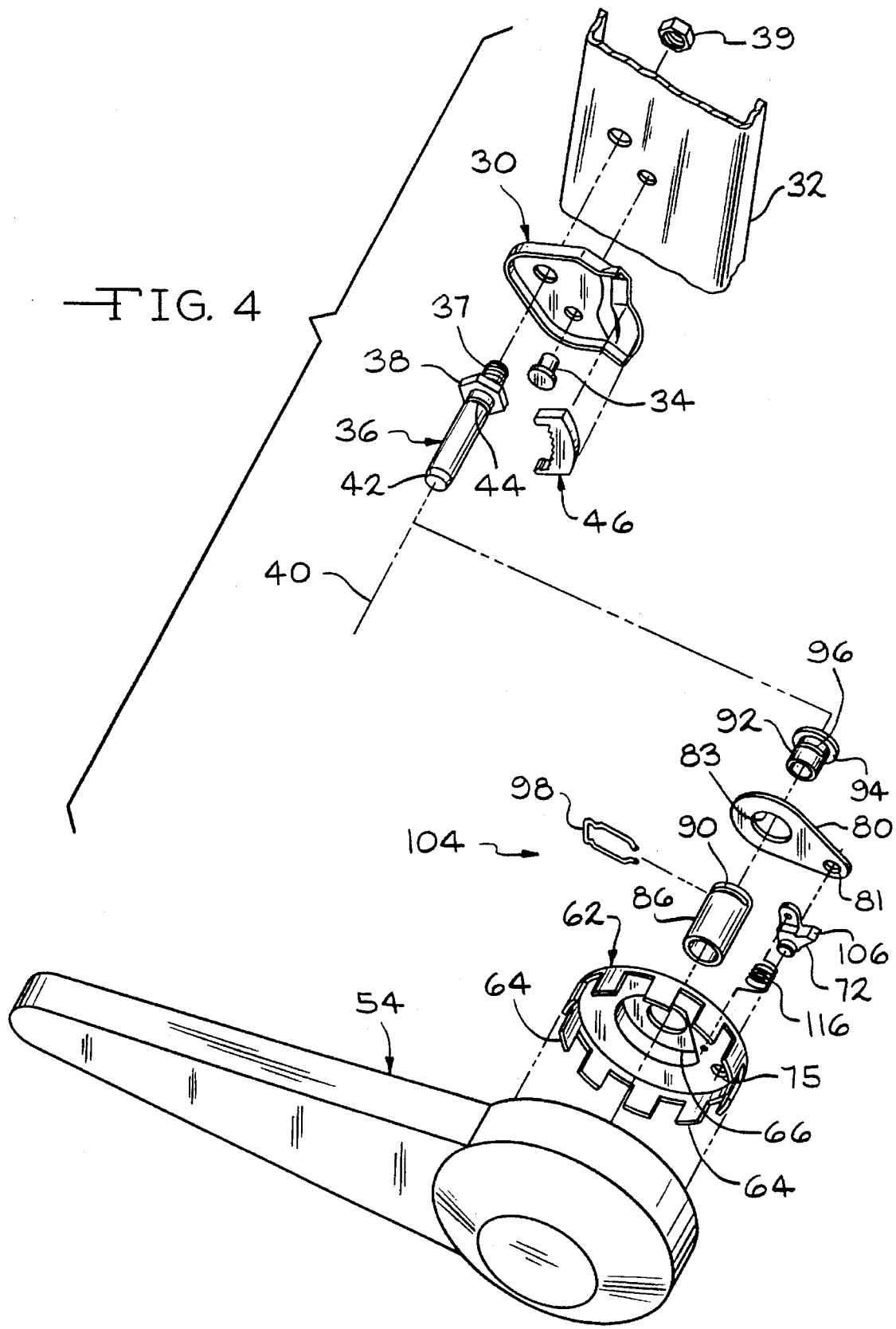
FIG. 4 is a perspective view illustrating the ratchet mechanism and mounting stud attached to the vehicle seat back.

The seat back structure for mounting the armrest to the seat back is shown in FIG. 4. A housing 30 is attached to the seat back frame 32. A rivet 34 or other fastener provides one attachment of the housing to the seat back frame while a mounting stud 36 provides a second attachment. The mounting stud 36 has a threaded end 37 which is inserted through aligned apertures in the housing and seat back frame and threaded into a weld nut 39 on the seat back frame. An enlarged hex flange 38 is used to tighten the stud to the seat back frame. The stud extends laterally from the seat back and defines an axis 40. The stud has a short taper 42 at its distal end. Near the hex flange 38, the stud includes a circumferential groove 44. The groove 44 is used to secure an armrest to the stud 36, as described in greater detail below.

A sector gear 46 is mounted in the housing 30 and forms a part of the ratchet mechanism 124 used to hold the armrest in an adjusted position. The sector gear 46 includes an array of teeth 48 which are arranged along an arc generally concentric about the axis 40 of the stud 36. The sector gear is provided with a release tooth 50 at one end of the array and a return tooth 52 at the opposite end of the array. The operation of the release and return teeth will be described more fully below in connection with the ratchet mechanism.

Figure 2:
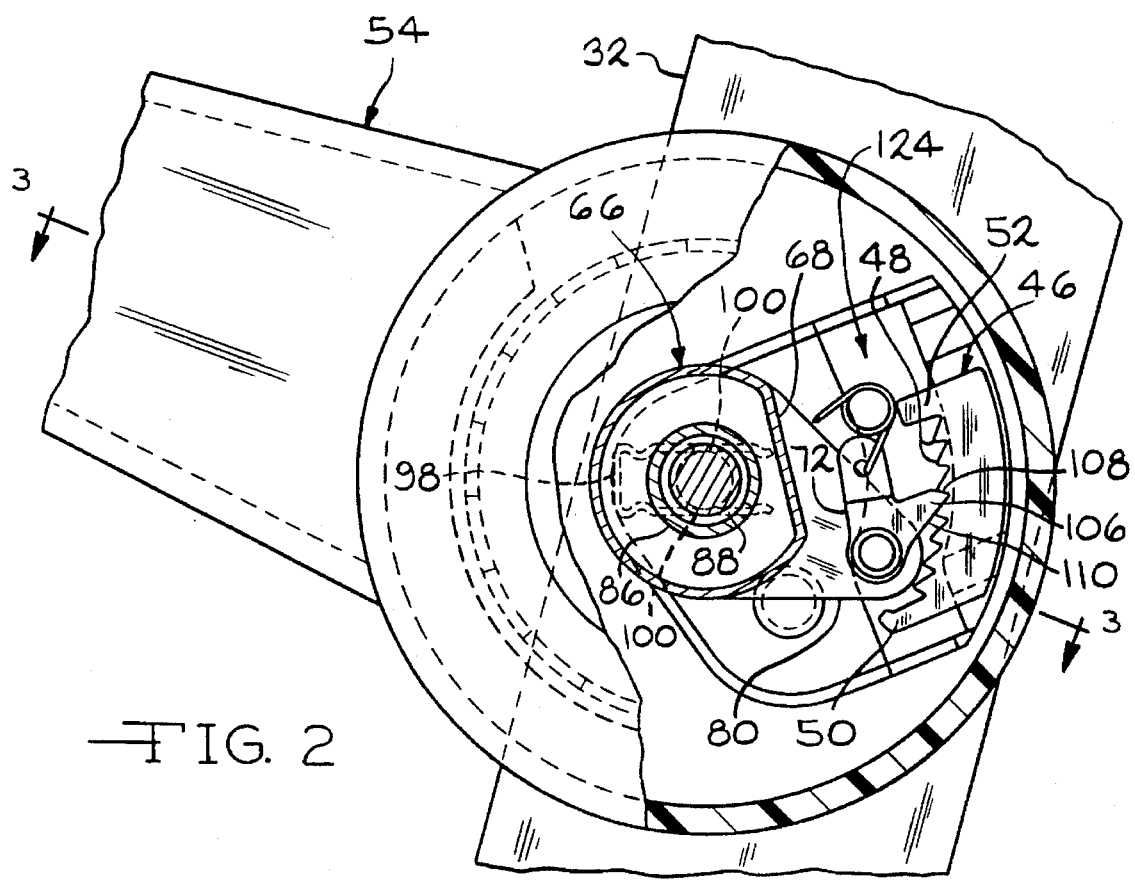
FIG. 2 is a side elevational view of the armrest illustrating the pawl and sector gear in a locked, engaged position holding the armrest in place.
Figure 3:
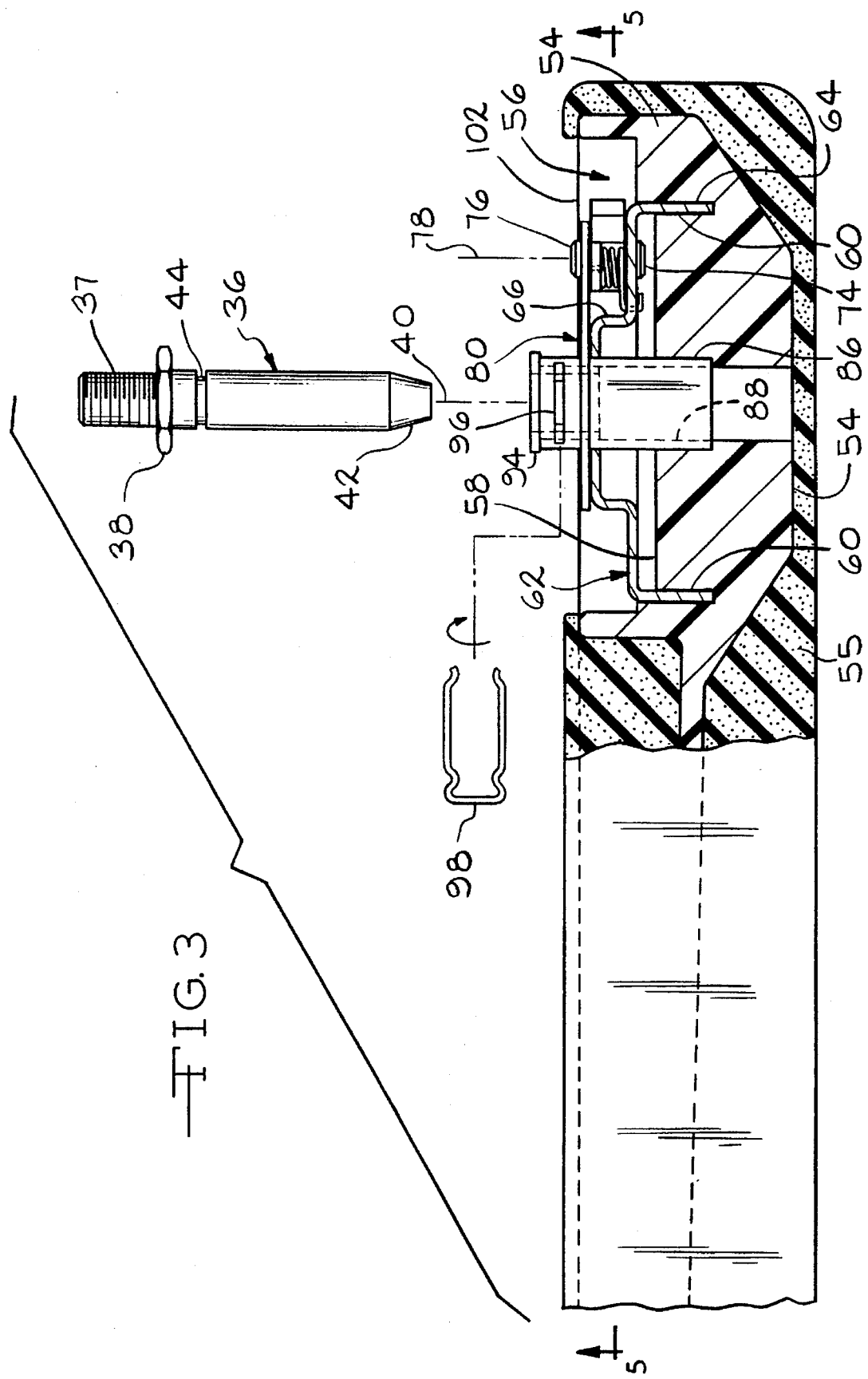
FIG. 3 is a top plan view and partial sectional view as seen from substantially the line 3—3 of FIG. 2 of the armrest.

The armrests 22, 24 are structurally identical to one another with left and right handed mirror image components. The structure of the armrest 22 is shown in FIGS. 2 and 3. The armrest 22 has a molded plastic armature or frame 54 which provides the structure of the armrest. Other materials can be used equally well for the armrest armature without departing from the present invention. The molded armature has a circular recess 56 which is concentric about the armrest pivot axis, which is the axis 40 of the stud. At the base 58 of the recess, the armature is formed with a plurality of axially extending slots 60 arranged in a circle. The armature is substantially covered with foam 55 which is in turn covered by an upholstery cover material (not shown).

A metal cap 62 is placed in the recess and has a plurality of fingers 64 which are pressed into the slots 60 to mount the cap 62 to the armature 54. The cap 62 has a raised circular hub 66 which is concentric about the pivot axis and which has a flat side 68. Adjacent the flat side 68, a pawl 72 is mounted to the cap 62. The pawl 72 has a pair of oppositely extending pivot pins 74, 76 which are used to mount the pawl and allow it to rotate about a pawl pivot axis 78, parallel to the stud axis 40. The pin 74 is inserted into an aperture 75 in the cap 62.

A plate 80 is welded to the hub 66 and extends over the pawl 72. The plate 80 has an aperture 81 in which the pin 76 is positioned whereby the pawl is sandwiched between the plate 80 and the cap 62. The plate 80 has an aperture 83 concentric with the armrest pivot axis and which is placed over a sleeve 86. The sleeve 86, in turn, is inserted into the armature 54. The sleeve 86, plate 80 and hub 66 are welded together with a single weld 82. The sleeve 86 forms a bore 88 which is sized to fit over the mounting stud 36. The armrest is mounted to the seat back by sliding the sleeve over the mounting stud 36. Since the stud and bore are both cylindrical, the armrest rotates about the stud. The sleeve 86 extends axially beyond the hub 66 and, near its end, has a pair of circumferentially extending slots 90 diametrically spaced from one another.

A cylindrical bushing 92 is placed within the bore and has an end flange 94. The bushing, like the sleeve, has circumferential slots 96 which are aligned with the circumferential slots 90 in the sleeve.

A wire spring clip 98 is placed over the sleeve and bushing by seating the clip into the circumferential slots in the sleeve and bushing. Portions of the clip 98 cross the bore 88 forming chords 100. When the sleeve is placed over the mounting stud 36, the clip portions forming the chords 100, are pushed radially outward by the taper end portion 42 of the mounting stud. The clip portions forming the chords 100 will slide across the cylindrical surface of the stud until they reach the circumferential groove 44 in the stud and will then seat within the groove. Once seated in the groove 44, the clip will retain the sleeve in position axially upon the stud 36, preventing removal of the armrest from the stud.

The clip 98 is positioned generally even with the exterior surface 102 of the armrest which confronts the side 21 of the seat back. By locating the clip 98 at the surface of the armrest, a flat tool such as a screw driver can be inserted between the armrest and the seat back to manipulate the clip 98 to remove it from the groove 44 in the stud. This permits removal of the armrest, if necessary, for servicing of the seat assembly. The slot 90, the clip 98 and the groove 44 function as a means 104 for coupling the armrest to the seat back.

The pawl 72 has a radially outwardly extending tooth 106 which has a flat side 108, which is generally radial relative to the pivot axis 40 of the armrest, and ramped opposite surface 110. When the armrest is mounted to the stud, the pawl tooth 106 engages one of the teeth 48 of the sector gear 46 when the armrest is within the adjustment range of use positions shown with the armrest 22 in FIG. 1. The sector gear teeth 48, like the pawl teeth, have a flat surface 112 which is generally radial with respect to the armrest pivot axis and an opposite ramped surface 114. The radial surfaces of the pawl and sector gear teeth are arranged to engage one another and resist downward rotation of the armrest within the adjustment range.

Figure 5:
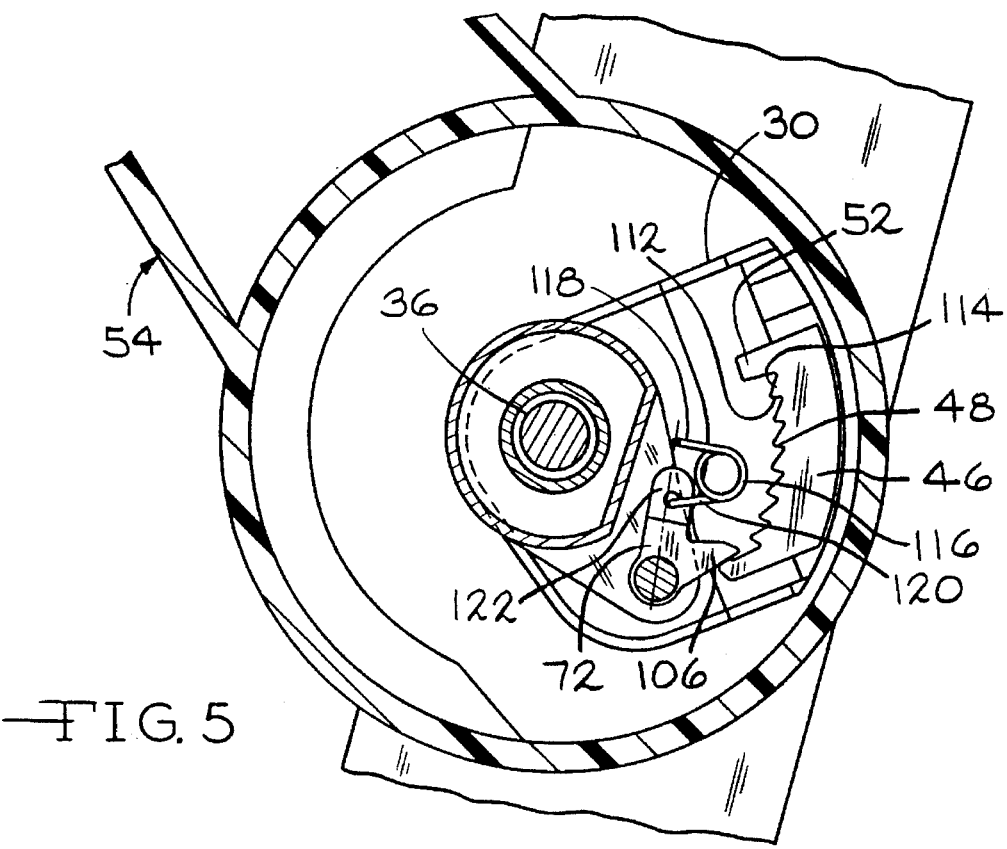
FIG. 5 is a side sectional view as seen from substantially the line 5—5 of FIG. 3 illustrating the armrest at the upper end of the adjustment range and the pawl engaging the release tooth.

A coil torsion spring 116 has one end 118 coupled to the cap 62 and a second end 120 coupled to a finger 122 of the pawl. The pawl finger 122 extends radially from the pawl pivot axis 78. The spring is positioned relative to the pawl such that the spring applies a clockwise force on the pawl when viewed in FIGS. 2 and 5 such that the pawl tooth 106 is forced outwardly into engagement with the sector gear teeth 48. Upon upward movement of the armrest, the ramped surface 110 of the pawl tooth will engage the ramped surface 144 of the next adjacent sector gear tooth, causing the pawl to rotate counter clockwise, in opposition to the spring 116 until the pawl tooth clears the tip of the next sector gear tooth. Upward movement of the armrest will continue with the pawl subsequently engaging each of the sector gear teeth as it is moved upward.

Figure 6:
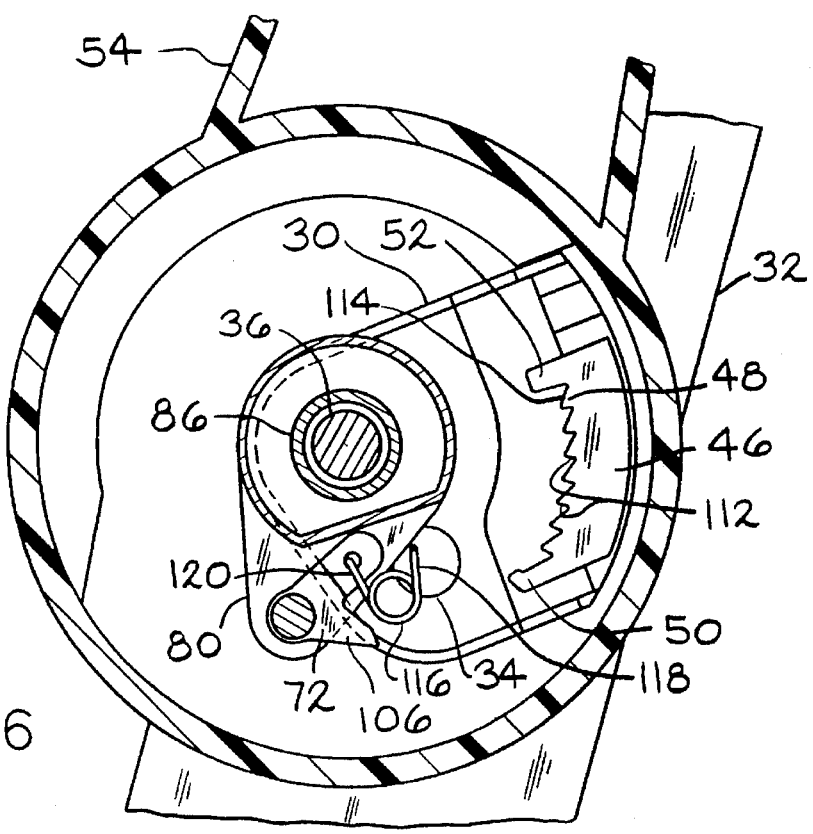
FIG. 6 is a side sectional view as seen substantially the line 5—5 of FIG. 3 illustrating the armrest in a raised stowed position.
Figure 7:
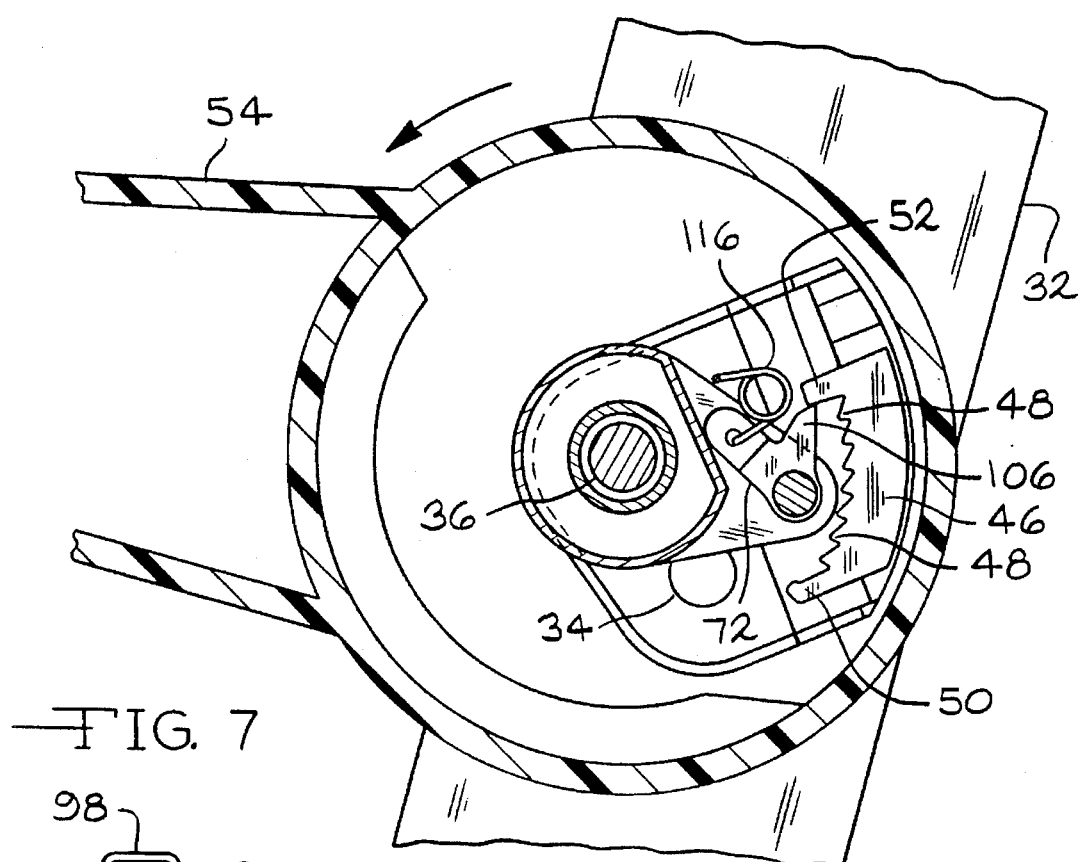
FIG. 7 is a side sectional view as seen from substantially the line 5—5 of FIG. 3 illustrating the armrest at the lower end of the adjustment range and the pawl engaging the sector gear return tooth.
Figure 9:
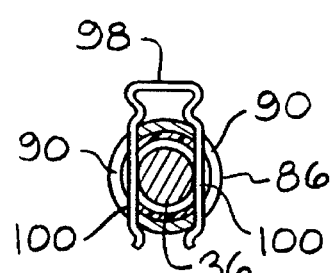
FIG. 9 is a sectional view as seen from substantially the line 9—9 of FIG. 8.
Figure 8:
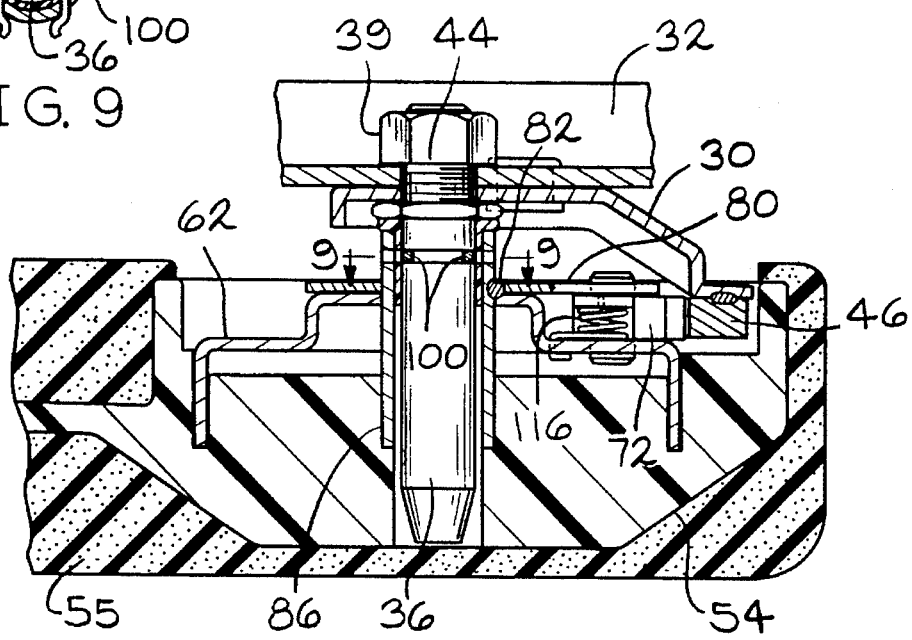
FIG. 8 is a sectional view as seen from substantially the line 3—3 of FIG. 2 with the armrest mounted to the seat back.

Upon reaching the end of the array of teeth 48, the ramped surface 110 of the pawl will engage the release tooth 50 of the sector. The release tooth 50 extends radially inward a greater distance than the sector gear teeth 48. As a result, the pawl must rotate counter clockwise a greater distance to clear the release tooth 50. The elongated tooth 50 causes enough rotation of the pawl to move the direction of the spring force exerted on the pawl over the pawl pivot axis such that the spring now biases the pawl in a counter clockwise direction (FIG. 6), holding the pawl tooth 106 out of engagement with the sector gear teeth 48. Once the armrest has been raised beyond the adjustment range and the pawl has cleared the sector gear release tooth, the armrest can continue to rotate upward to the stowed position parallel to the seat back, if desired. Alternatively, the armrest can now be lowered to the lower end of the adjustment range with the pawl tooth 106 moving passed the sector gear teeth 48 without engagement, as shown in FIG. 7.

At the opposite end of the array of teeth on the sector gear, the return tooth 52 extends radially inward far enough to engage the pawl tooth, even after the pawl has been rotated over center. Upon engagement with the return tooth 52, the pawl will be rotated clockwise, causing the spring force to return over center to a position in which the pawl is again biased in the clockwise direction. This produces engagement of the pawl tooth with the sector gear teeth, locking the armrest in place at the lower end of the adjustment range. The pawl and sector gear function as a ratchet mechanism 124 for locking the armrest in place and allowing adjustment of the armrest.

In operation, the armrest is adjusted upwardly to a desired position. If the armrest is currently at a higher position than desired, the armrest must be raised to the upper end of the adjustment range to release the pawl. The armrest is returned to the lower end of the adjustment range, and then adjusted upward to the desired position.

It is to be understood that the invention is not limited to the exact construction illustrated and described above, but that various changes and modifications may be made without departing from the spirit and scope of the invention as defined in the following claims.

We claim:

1. In a vehicle seat assembly having a generally horizontal seat cushion, a generally upright seat back having a lateral side and an armrest mounted to said lateral side of said seat back, said armrest having an exterior surface portion which is disposed adjacent said seat back lateral side when said armrest is mounted to said seat back, apparatus for mounting said armrest to said seat back comprising:

a mounting stud extending laterally from said seat back and having a longitudinal axis;

a sleeve projecting into said armrest forming a bore in said armrest of a size to receive said mounting stud therein whereby said sleeve can be placed over said stud and moved axially there along, said sleeve extending outward beyond said exterior surface portion of said armrest; and coupling means operatively associated with said sleeve and said stud for locking said sleeve to said stud at a predetermined axial position of said sleeve on said stud in which said exterior surface portion of said armrest is adjacent said seat back lateral side, said coupling means preventing axial movement of said sleeve along said stud and subsequent removal of said armrest from said stud, said coupling means being located axially approximately even with said armrest exterior surface portion when said armrest is in said predetermined axial position whereby said coupling means can be accessed between said armrest and said seat back lateral side.

2. The vehicle seat assembly of claim 1 wherein said stud and said bore are both cylindrical in shape to enable rotation of said sleeve and said armrest about the axis of said stud.

3. The vehicle seat assembly of claim 2 wherein said armrest extends in a generally forward direction from said seat back and is rotatable about said stud over an adjustment range of use positions having upper and lower ends and further comprising ratchet means for preventing downward rotation of said armrest while permitting upward movement of said armrest within said adjustment range.

4. The vehicle seat assembly of claim 3 wherein said armrest is freely rotatable upwardly and downwardly to and from a stowed position above said adjustment range of use positions.

5. The vehicle seat assembly of claim 3 further comprising release means for releasing said ratchet means after said armrest is moved upward beyond said upper end of said adjustment range to enable downward movement of said armrest until said armrest is lowered to said lower end of said adjustment range.

6. The vehicle seat assembly of claim 5 wherein said ratchet means includes a sector gear fixed to said seat back having an array of teeth arranged in an arc concentric about said stud axis, a pawl rotatably coupled to said armrest having a tooth engageable with said sector gear teeth, said pawl and sector gear teeth being configured to permit sliding of said pawl tooth along said sector gear teeth as said armrest is raised and to abut one another when said armrest is forced downward to prevent lowering of said armrest in said adjustment range, and spring means for biasing said pawl tooth into engagement with said sector gear teeth.

7. The vehicle seat assembly of claim 6 wherein:

said release means includes an elongated release tooth at the end of said array of sector gear teeth causing sufficient rotation of said pawl as said pawl passes said release tooth to rotate said pawl over center with respect to said spring means whereby said spring means biases said pawl tooth away from said sector gear whereby said armrest can be lowered; and said sector gear having an elongated return tooth at the opposite end of said array to engage said pawl tooth when in said release position to return said pawl over center with respect to said spring means to once again bias said pawl tooth toward said sector gear.

8. The vehicle seat assembly of claim 1 wherein said armrest includes a plastic molded structural member with said sleeve being mounted to said structural member.

9. In a vehicle seat assembly having a generally horizontal seat cushion, a generally upright seat back having a lateral side and an armrest mounted to said lateral side of said seat back and extending generally forwardly therefrom and said armrest being rotatable over an adjustment range of use positions having upper and lower ends, ratchet means for preventing downward rotation of said armrest while permitting upward movement of said armrest within said adjustment range comprising:

a sector gear fixed to said seat back having an array of teeth arranged in an arc concentric about an axis of rotation of said armrest;

a pawl rotatably coupled to said armrest having a tooth engageable with said sector gear teeth, said pawl and sector gear teeth being configured to permit sliding of said pawl tooth along said sector gear teeth as said armrest is raised and said pawl and sector gear teeth being configured to abut one another when said armrest is forced downward to prevent lowering of said armrest in said adjustment range;

spring means for biasing said pawl tooth into engagement with said sector gear teeth;

release means for releasing said ratchet means after said armrest is moved upward beyond said upper end of said adjustment range to enable downward movement of said armrest until said armrest is lowered to said lower end of said adjustment range, said release means including an elongated release tooth at the end of said array of sector gear teeth causing sufficient rotation of said pawl as said pawl passes said release tooth to rotate said pawl over center with respect to said spring means whereby said spring means biases said pawl tooth away from said sector gear to enable said armrest to be lowered; and said sector gear having an elongated return tooth at the opposite end of said array to engage said pawl tooth when in said release position to return said pawl over center with respect to said spring means to once again bias said pawl tooth toward said sector gear.

10. In a vehicle seat assembly having a generally horizontal seat cushion, a generally upright seat back having a lateral side and an armrest mounted to said lateral side of said seat back, apparatus for mounting said armrest to said seat back comprising:

a mounting stud extending laterally from said seat back and having a longitudinal axis;

a sleeve projecting into said armrest forming a bore in said armrest of a size to receive said mounting stud therein whereby said sleeve can be placed over said stud and moved axially there along; and coupling means operatively associated with said sleeve and said stud for locking said sleeve to said stud at a predetermined axial position of said sleeve on said stud to prevent axial movement of said sleeve along said stud and subsequent removal of said armrest from said stud, said coupling means including a wire spring clip mounted to said sleeve and seated in a circumferential slot in said sleeve with a portion of said clip forming a chord crossing said bore and a groove in said stud into which said portion of said clip forming said chord is seated when said armrest is in said predetermined axial position to prevent axial movement of said sleeve on said stud.

11. The vehicle seat assembly of claim 10 wherein said armrest has an exterior surface, said exterior surface being adjacent said seat back when said armrest is in said predetermined axial position on said stud, said sleeve extending from said armrest beyond said exterior surface; and said wire spring clip mounted to said sleeve approximately even with said exterior surface whereby said clip can be removed from said groove by manipulation of a flat tool inserted between said seat back and said armrest exterior surface.

12. The vehicle seat assembly of claim 10 wherein said stud has a tapered distal end portion to reduce the diameter of said stud at said distal end whereby said tapered end portion forces said chord formed by said wire spring clip outwardly as said sleeve is slid over said stud.

13. The vehicle seat assembly of claim 10 wherein said sleeve has a pair of said circumferential slots and a portion of said wire spring clip is disposed in each of said slots forming a pair of chords crossing said bore and seating in said groove in said stud.

14. The vehicle seat assembly of claim 13 wherein said two slots in said sleeve are diametrically opposite one another.

* * * * *